United States Patent

[11] 3,584,526

| [72] | Inventor | Walter H. Kleinhenn |
| | | Flourtown, Pa. |
| [21] | Appl. No. | 794,057 |
| [22] | Filed | Jan. 27, 1969 |
| [45] | Patented | June 15, 1971 |
| [73] | Assignee | Standard Pressed Steel Co. |
| | | Jenkintown, Pa. |

[54] TOOL FOR INSTALLING THREADED INSERT
8 Claims, 2 Drawing Figs.
[52] U.S. Cl. .................................................. 81/53.2
[51] Int. Cl. ............................................... B25b 13/50
[50] Field of Search ............................... 81/53.2, 71; 85/50

[56] References Cited
UNITED STATES PATENTS

| 2,817,987 | 12/1957 | Boose | 81/53.2 |
| 3,392,728 | 7/1968 | Bone et al. | 85/50 |
| 2,684,606 | 7/1954 | Brawley | 81/53.2 |
| 2,704,473 | 3/1955 | Walther | 81/53.2 |

FOREIGN PATENTS

| 812,453 | 4/1959 | Great Britain | 81/53.2 |

*Primary Examiner*—James L. Jones, Jr
*Attorney*—Stanley Belsky

ABSTRACT: A tool for installing threaded inserts having a shank with a threaded stud projecting axially from a shoulder at one end for threaded engagement with the bore of the insert, a jam nut threaded on the stud and a dissimilar metal washer interposed between the shoulder and nut to reduce friction and prevent seizing between the nut and the shoulder.

PATENTED JUN 15 1971 3,584,526
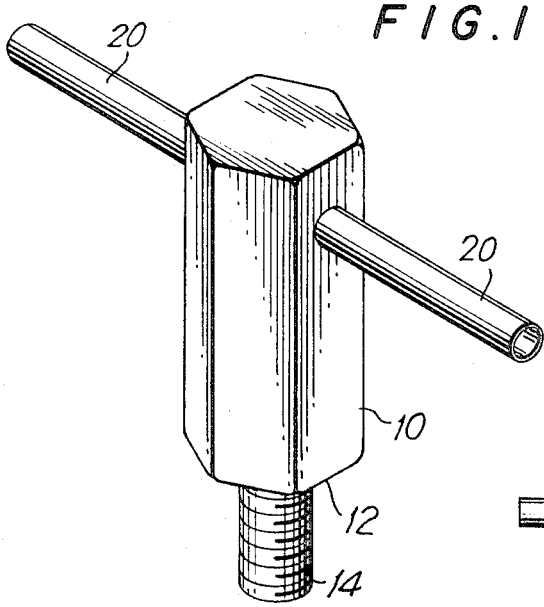
FIG.1
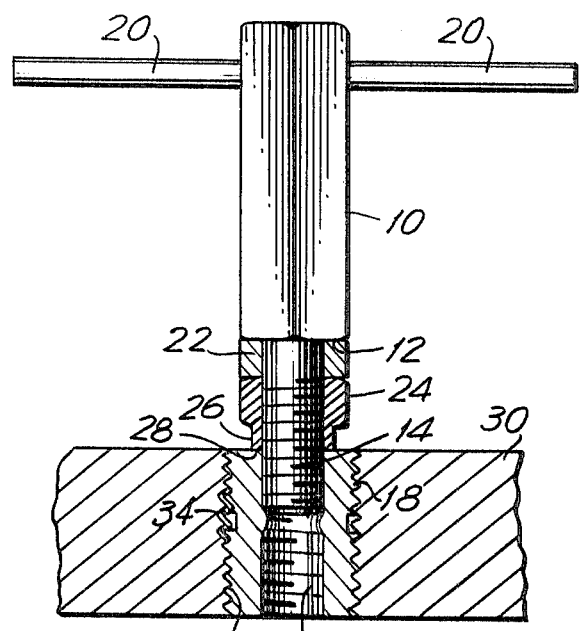
FIG.2
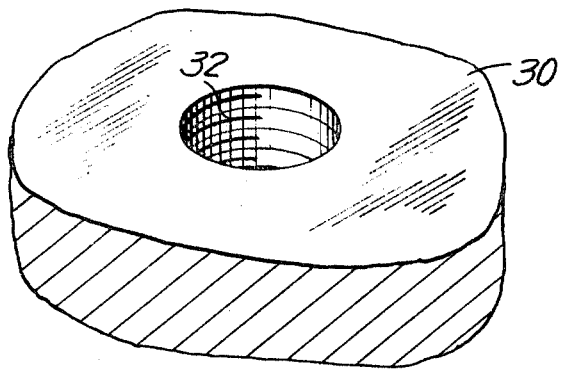
INVENTOR
WALTER H. KLEINHENN
BY
Curtis, Morris & Safford
ATTORNEYS

TOOL FOR INSTALLING THREADED INSERT

This invention relates to a tool for installing internally and externally threaded tubular inserts of the general type disclosed in my copending application Ser. No. 745,000 filed July 15, 1968, now U.S. Pat. No. 3,495,642 issued Feb. 17, 1970.

Such inserts, preferably formed of a hard material such as steel, are usually installed in threaded holes in body members of softer, more malleable material in order to resist wearing or damaging of the threads upon repeated installation and removal of male threaded members, such as bolts and studs, into and from the body member.

The present invention provides a tool of extremely simple and economical construction, and yet which is thoroughly effective and rapid in operation and easy to use, as well as rugged and foolproof.

In the drawing:

FIG. 1 is an exploded isometric view of an illustrative handtool embodying features of the present invention, also showing a threaded insert and a body member into which it is to be installed by the tool.

FIG. 2 is an elevational view partly in section, showing the tool, insert and body member of FIG. 1 after the insert has been installed in the body member but before withdrawal of the tool.

The illustrative handtool shown in the drawing comprises an elongated shank 10 which is of hexagonal cross section throughout its length and which is provided at its inner (lower) end with a planar, annular shoulder 12 from which axially projects a stud 14 which is externally threaded for threaded engagement with the internally threaded bore 16 of the insert 18 to be installed. The shank 10 is provided near its outer (upper) end with a transverse bore through which extends a crossbar 20 which projects radially from opposite sides of the shank 10 to provide leverage for manually rotating the shank.

The crossbar 20 may be advantageously formed of an elongated spring pin (a longitudinally slotted tube) which is force fitted in the hole in the shank 10.

Encircling the stud 14 in abutment with the shoulder 12 is a washer 22 and threaded on the stud 14 beyond the washer 22 is a jamnut 24. The washer 22 is preferably formed of a somewhat softer dissimilar metal, such as aluminum, and serves to facilitate rotation of the jamnut 24 and to prevent seizing of the jamnut 24 and shoulder 12, such as would tend to occur if they were in direct interfacial contact under the pressures which may be encountered in installation of an insert 18.

The jamnut 24 is provided at its periphery with wrenching faces, such as are afforded by the conventional hexagonal surfaces shown, for engagement by a wrench. And, as shown in FIG. 2, the outer end of the jamnut 24 is provided with an outwardly projecting axial neck portion 26 having at its outer end a planar bearing face 28 with an outside diameter less than the width of the nut 24 and less than the outside diameter of the insert 18. Thus, when the bearing face 28 is abutted against the outer end of the insert 18 to limit the depth to which the projecting end of the stud 14 may be threaded into the insert, the bearing face 28 does not project radially outwardly beyond the edges of the insert where it could frictionally engage the outer face of the body member 30 into which the insert is to be installed.

The insert 18 is externally threaded for engagement with an internally threaded hole 32 in the body member 30 and is provided with self-locking means, such as the locking element 34 of thermoplastic resin (for example, a polyamide such as nylon 11) which is shown seated in a recess formed at one side of the insert, but may alternatively be bonded to the undistorted threads of the insert, as disclosed in the Joseph P. Villo U.S. Pat. No. 3,093,177 issued June 11, 1963. As disclosed in said Villo patent, the locking element 34 resiliently engages the threads at one side of the hole 32, forcing the mating threads at the opposite side into tight frictional engagement, creating a high prevailing torque which strongly resists removal of the insert 18 from the body member 30.

The internal thread of the insert may also be provided with self-locking means. For example, as disclosed more fully in my aforementioned copending application, the body member may be slightly indented at one or more angularly spaced points in a common central plane to give its bore 16 a slightly noncircular shape and increase the frictional engagement with a bolt or stud threaded into it.

To install the insert 18 into the hole 32 in the body member 30, the stud 14 is first threaded into the bore 16 of the insert. Then the insert is forcibly threaded into the hole 32 by rotation of the shank 10, for example to the point shown in FIG. 2 at which the outer surface of the insert is flush with that of the body member 30. To remove the tool, the jamnut 24 is held against rotation, for example by an open end wrench engaging the wrenching surfaces of the nut, and the shank 10 is rotated in the opposite direction.

The aluminum washer 22 interposed between the nut 24 and the shoulder 12 facilitates such rotation of the shank 10 relative to the nut 24, so that even the relatively higher unseating torque necessary to start the rotation can be readily applied by manual pressure on the crossbar 20. However, in the event the friction between the stud 14 and the insert 18 is too great (due to the internal self-locking feature of the insert) to permit such manual rotation without undue effort, the shank 10 can be rotated by a second wrench applied to the hexagonal surfaces of the shank. Usually after a fractional reverse turn of the shank 10 to break the seated friction at the interfaces between the shoulder 12 and the washer 22 and between the washer 22 and the nut 24, the shank 10 can be turned rather easily by hand to complete backing of the stud 14 out of the bore 16 of the insert.

The thickness of the washer 22 preferably is selected to limit the projection of the stud 14 from the bearing face 28 so that the stud can penetrate only the portion of the insert 18 above the effective area of the internal self-locking means therein, thus facilitating unthreading of the stud from the insert.

I claim:

1. A tool for installing an externally threaded tubular insert, said tool comprising a shank having an externally threaded stud projecting axially from a shoulder at one end of said shank for threaded engagement with the bore of said insert, a jamnut threaded on said stud and having a bearing surface at one end for bearing on an end surface of said insert, and a washer interposed between said shoulder and the surface at the other end of said jamnut to facilitate rotation of said shank relative to said jamnut at the start of the operation of withdrawing said stud from said insert.

2. A tool as described in claim 1 in which said shank has near its outer end a crossbar projecting from either side to facilitate manual rotation of said shank.

3. A tool as described in claim 2 in which said shank is also provided with opposed flat surfaces engageable by a wrench.

4. A tool as described in claim 3 in which said shank is of hexagonal cross section substantially throughout its length.

5. A tool as described in claim 1 in which said jam nut is provided with opposed flat surfaces engageable by a wrench to hold said jamnut against rotation during withdrawal of said stud from said insert.

6. A tool as described in claim 1 in which said shank and stud and said jamnut are made of steel, and said washer is made of a nonferrous metal.

7. A tool as described in claim 6 in which said washer is aluminum.

8. A tool as described in claim 1 for use with an internally and externally threaded tubular insert having internal locking means therein intermediate the insert ends wherein the thickness of said washer is selected so that the length of said stud projecting beyond said bearing surface is sufficient to penetrate only the upper portion of the threaded bore of said insert above the effective area of the internal locking means therein.